(12) United States Patent
Redlin (10) Patent No.: US 7,323,022 B1
(45) Date of Patent: Jan. 29, 2008

(54) VACUUMING MACHINE

(75) Inventor: William L Redlin, Ocala, FL (US)

(73) Assignees: Hobert Ronald Baute, Ocala, FL (US); Lois Baute, Ocala, FL (US)

( * ) Notice: Subject to any disclaimer, the term of this patent is extended or adjusted under 35 U.S.C. 154(b) by 550 days.

(21) Appl. No.: 10/903,670

(22) Filed: Jul. 30, 2004

(51) Int. Cl.
*B01D 46/00* (2006.01)

(52) U.S. Cl. ............................. 55/319; 55/428; 55/432; 55/356; 55/471; 55/472; 55/DIG. 3; 15/340.1; 15/347; 15/353; 96/414

(58) Field of Classification Search .................. 55/319, 55/356, 392, 394, 395, 428, 429, 432, 467, 55/471, 472, 506, DIG. 3; 15/340.1, 347, 15/353; 96/414–416
See application file for complete search history.

(56) References Cited

U.S. PATENT DOCUMENTS

| | | | | |
|---|---|---|---|---|
| 3,308,608 A | * | 3/1967 | Brimberg ..................... | 96/382 |
| 3,406,423 A | * | 10/1968 | Young ......................... | 15/347 |
| 3,540,073 A | * | 11/1970 | Issenmann et al. ........... | 15/352 |
| 3,744,653 A | | 7/1973 | Jensen | |
| 4,111,670 A | * | 9/1978 | DeMarco ..................... | 55/315 |
| 4,218,226 A | * | 8/1980 | Boozer ........................ | 96/414 |
| 4,227,893 A | * | 10/1980 | Shaddock .................... | 95/268 |
| 4,289,439 A | | 9/1981 | Hansson | |
| 4,574,420 A | * | 3/1986 | Dupre .......................... | 15/331 |
| 4,781,526 A | * | 11/1988 | Mead ....................... | 415/121.2 |
| 4,822,430 A | * | 4/1989 | Carberry ..................... | 134/21 |
| 4,885,817 A | * | 12/1989 | Tanase ...................... | 15/340.1 |
| 5,010,620 A | * | 4/1991 | Young ......................... | 15/347 |
| 5,030,259 A | * | 7/1991 | Bryant et al. ................. | 55/302 |
| 5,226,757 A | * | 7/1993 | Tarrant ........................ | 406/39 |
| 5,236,478 A | * | 8/1993 | Lewis et al. .................. | 55/319 |
| 5,630,247 A | * | 5/1997 | Venia ........................... | 15/347 |
| 5,685,134 A | | 11/1997 | Thornburg | |
| 6,029,312 A | | 2/2000 | Whitney | |
| 6,149,698 A | * | 11/2000 | Uehara ...................... | 55/385.1 |
| 6,444,003 B1 | * | 9/2002 | Sutcliffe ..................... | 55/385.1 |
| 6,588,053 B1 | | 7/2003 | Nowak | |
| 6,742,219 B2 | * | 6/2004 | Lenzmeier et al. ........... | 15/345 |
| 6,942,717 B2 | * | 9/2005 | Armstrong et al. ............ | 95/26 |
| 6,948,213 B2 | * | 9/2005 | Kim .......................... | 15/340.4 |
| 7,191,485 B1 | * | 3/2007 | Ramer ......................... | 15/34 |
| 2003/0192816 A1 | | 10/2003 | Opfel | |
| 2004/0003481 A1 | | 1/2004 | Tarrant | |
| 2004/0221717 A1 | * | 11/2004 | Armstrong et al. ............ | 95/26 |
| 2007/0079471 A1 | * | 4/2007 | Tagliaferri ................. | 15/340.1 |

\* cited by examiner

*Primary Examiner*—Duane Smith
*Assistant Examiner*—Robert A Clemente
(74) *Attorney, Agent, or Firm*—Saliwanchik, Lloyd & Saliwanchik (57) ABSTRACT

The subject invention pertains to a vacuuming machine with a primary chamber in which vacuum pressure within allows the ingress of debris through a hose. Air and debris entering the primary chamber decelerate upon entry into the chamber which allows debris to settle out of the air column within the primary chamber. Air within the primary chamber is evacuated through an enlarged filter and duct system that carries the air through a filter hopper and fan plate to a rotating fan. The blades of the fan move air and particulate matter through a second duct into a secondary chamber in which another deceleration of air and debris allows additional debris to settle to the bottom of the secondary chamber before air is finally evacuated from the vacuum machine.

19 Claims, 10 Drawing Sheets

VACUUMING MACHINE

BACKGROUND OF INVENTION

The present invention is directed to an all-purpose vacuuming machine suited for industrial or farm use. The subject invention can vacuum various types, sizes, and weights of matter which is then deposited into collection chambers. Most vacuums utilize various types of filters to prevent debris from exiting the device with the exhausted air. However, a universal problem with most of these filtering systems is that they become clogged with debris. The subject invention addresses this issue with a unique filtering system within the device that is less prone to clogging and allows for the exhausting of relatively clean air.

BRIEF SUMMARY OF THE INVENTION

The subject invention pertains to a vacuuming machine particularly useful for industrial or farm waste. The invention is ideally suited for cleaning animal stalls, particularly animal wastes, hay, and other organic or non-organic debris. The system of filters and exhaust in the subject invention can reduce or eliminate exhaust debris and can also reduce or eliminate the need to clean the filters within the machine. The subject vacuuming machine utilizes a fan to create a vacuum within a primary chamber. By attaching a hose, tube, or pipe to the primary chamber the vacuum within the chamber allows debris to be moved or "sucked" up by the hose, tube, or pipe. The debris moves rapidly through the hose, tube, or pipe until it reaches the primary chamber. At that point, the reduction in air speed which occurs when the air and debris enter the primary chamber allows debris to be deposited onto the floor of the primary chamber. The air within the primary chamber is drawn through a grid-like filter located in the upper portion of the primary chamber and into a filter duct that can lead to a smaller filter hopper before exiting through an opening in a fan plate leading to the fan. Because the air flowing through the filter duct is moving into the smaller area of the filter hopper, the air flow is again increased. This increase in air flow ensures that any debris which comes through the filter and the duct remains suspended as the exhausted air is moved by the blades of the fan into an connection duct which leads into a secondary chamber. The air coming through the connection duct, moving at increased speed enters the secondary chamber. Once the exhausted air moves into the secondary chamber, which is a larger volume than the connection duct, the air slows down allowing any particulate matter carried through the fan and the connection duct to be deposited on the floor of the secondary chamber. The slower moving exhausted air in the secondary chamber can then move through an exhaust filter as it exits the vacuuming machine. This dual gravity-dependent filtering process provides exemplary vacuuming power and exhausted air that is relatively free of debris.

DETAILED DISCLOSURE

The subject invention provides an improved vacuuming machine that in a preferred embodiment is particularly suited for industrial or farm use. However, it is possible for the device of the subject invention to be scaled for home or other indoor use. The subject invention is suited for vacuuming a variety of materials, including solids, semi-solids, liquids, or combinations thereof. A particular advantage of the device of the subject invention is its filtering system. The configuration of the filtering system of the device does not lend itself to being easily clogged or blocked with debris. In fact, when the vacuuming machine is properly calibrated, most incoming debris will not reach the filters until the device has reached approximately 70% to about 80% capacity.

The design of the vacuum machine makes it ideally suited for large industrial site cleaning or field or yard use. It is particularly suited for cleaning animal stalls or cages, particularly horse stalls. The subject invention is particularly useful for, though not limited to, removal of animal waste products, hay, bedding, feed, etc. from horse or animal stalls or cages. The size of the hose, tube, or pipe used with the device can determine how precise an area can be cleaned. It is known in the art that various attachments can be used with vacuum hoses for specific cleaning purposes. Similar attachments can be readily envisioned and scaled for use with the subject invention.

The subject vacuuming machine, as with many vacuuming systems known in the art, can be made portable. As illustrated in the figures, the subject invention can be mounted on a trailer for transport. However, it may also be possible for the device to be mounted such that debris can be brought to the device. Alternatively, the hose, tube, pipe, or combination thereof on the subject invention can be elongated in order to reach desired areas. In either situation, the suction power of the device is preferably, but not necessarily, adjustable to accommodate the increased or decreased length of the hose, tube, or pipe used on the device. In an alternative embodiment, a hose, tube, or pipe may not be necessary for the device. Debris could be fed directly into an opening in the vacuum machine if desired.

Referring now the drawings, the device will be described in greater detail. As with many vacuum systems known in the art, the subject vacuuming machine utilizes a fan and engine system to create a vacuum within the vacuuming machine 10. This is accomplished by extracting air from a confined space, or primary chamber, in the vacuum system utilizing a fan moving at a high rate of speed to draw air out of the primary chamber. In a preferred embodiment, the fan and engine system of the subject invention allows for adjustment of the vacuum pressure. However, it can be appreciated that there may be numerous methods and devices that could be used to create the necessary vacuum for the subject invention. These various methods for creating a vacuum may also have a means for adjusting the vacuum pressure within the system. In a preferred embodiment, the subject invention can utilize an engine system 9 to rotate a fan 12 which extracts the air from the primary chamber of the vacuum machine. In a further preferred embodiment, the speed of the engine system 9 may be adjustable, such that the speed of the fan 12, and thus the suction power of the hose attached to the vacuum machine, can be adjustable.

Figure 4A:
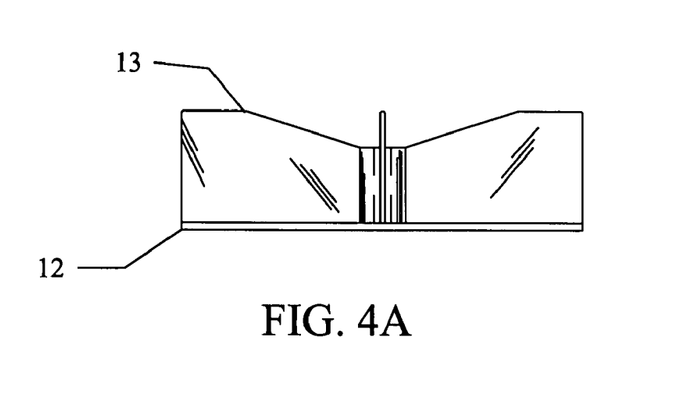
FIG. 4A is a side view of the fan style used in a preferred embodiment of the subject invention. As can be seen in this illustration, the preferred fan style has fluted blades which slope inward towards the center of the fan. When in position in the fan housing, this fan style effectively promotes the flow of air and debris into the connection duct.
Figure 4B:
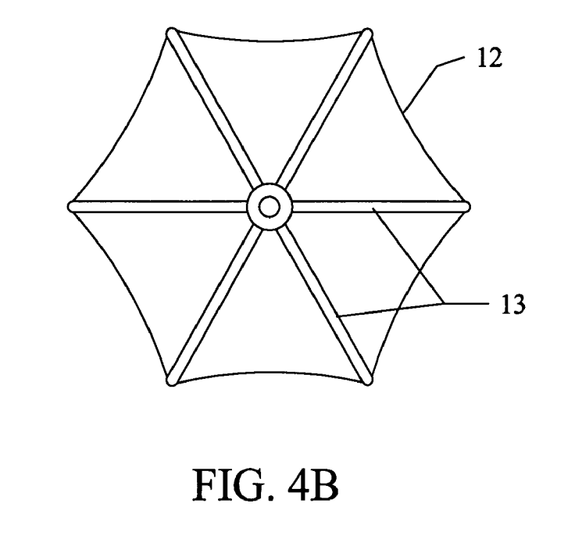
FIG. 4B is a front elevation view of the fan style shown in FIG. 4A.

There are a multitude of fan designs that can be utilized with the subject invention. The fan design utilized may have one or more blades, and said blades may have various cuppings or curvatures along their length to increase air flow. The fan and the blades thereon may comprise a variety of one or more materials including, but not limited to, plastics, metals, woods, rubbers, glass, or composites thereof. The fan design should also be able to maximize the flow of air out of the primary chamber which will increase the vacuum pressure within the device, which in turn increases the suction force. The fan style and material utilized should be durable enough to withstand the impact of particulate matter carried through the fan 12 and striking the blades 13 of the fan. In a preferred embodiment the fan 12 utilized in the subject invention is a design commonly referred to as a "dirty-air design" which consists of a disk with blades attached along their length on one side. In a further preferred embodiment, the fan utilized in the subject invention is a 22-inch diameter disk with six straight blades radiating from the center hub of the fan and attached to the disk along their lengths, as illustrated in FIGS. 4A and 4B. In a further preferred embodiment, the blades 13 of the fan are curved towards the center hub of the fan, as illustrated in FIG. 4A. In yet a further preferred embodiment, the height of the blades at the edge of the disk can be approximately 4" to about 6", while the height of the blades nearest the hub of the fan are approximately 3" to about 5". In a still further preferred embodiment, the 22-inch diameter disk can have scalloped edges between the fan blades wherein the edges of the disk curve inward and below the outer edge of the fan blades, as shown in FIG. 4B. In a further preferred embodiment, the fan is located within a sealed housing with ducts to control the incoming and outgoing air flow from the fan. The placement and full operation of the fan will be discussed below.

There may also be one or more openings or vacuum inlets 7, which allow ingress of air and debris into the device. In a preferred embodiment, the vacuum inlet 7 allows ingress of air and debris to a storage area or primary chamber 14 within the device. As mentioned above, a hose, tube, pipe, or similar devices or combinations thereof can be integrally connected to the vacuum inlet 7. In a preferred embodiment, one end of a hose 5 is connected to the vacuum inlet 7. In a further preferred embodiment, the hose 5 is flexible enough to allow movement around the area(s) to be cleaned. It is well known by those with skill in the art that the suction force at the open end of the hose can be determined by the diameter of the hose and the force of the vacuum created within the hose by the vacuuming machine. In addition, the tensile strength of the walls of the hose can be factor in the amount of vacuum force that can ultimately be achieved within the hose. If the hose lacks sufficient tensile strength to withstand the vacuum pressure within the hose, it may collapse or "suck in" on itself. In a preferred embodiment, the hose used with the subject invention is an approximately 4 inches to about 10 inches in diameter, flexible, reinforced hose approximately 25 feet to about 50 feet long. However, the effective length and diameter of the hose can vary depending upon the nature of the materials to be vacuumed into the machine, the amount of vacuum force that can be created within the device, etc. In addition, various specialized attachments can be used with or attached to the hose, or the end of the hose, to aid in the suctioning or vacuuming of debris or liquid through the hose, up to the vacuum inlet 7 and into a first or primary chamber 14. As will be readily apparent to the skilled artisan, other diameters and/or lengths of hose could be adapted for use in the subject invention depending on which is most suitable for its intended use.

Continuing the process, air and debris or particulate matter 2 are brought into the open end of the hose 5 and carried along the length of the hose to the vacuum inlet 7. The vacuum inlet 7 opens into a primary chamber 14. As the air and debris mixture moves through the vacuum inlet 7 into this primary chamber 14 the speed at which the air and debris mixture is moving will begin to decrease. This is referred to as the "conservation of flux" and pertains to the movement of air from a smaller volume area to a larger volume area, in this case from the smaller volume of the hose 5 into the larger volume of the primary chamber 14. As the air moves into the primary chamber 14 and slows down, debris carried with the incoming air begins to drop out and fall to the floor of the primary chamber.

Figures 1A, 1B:
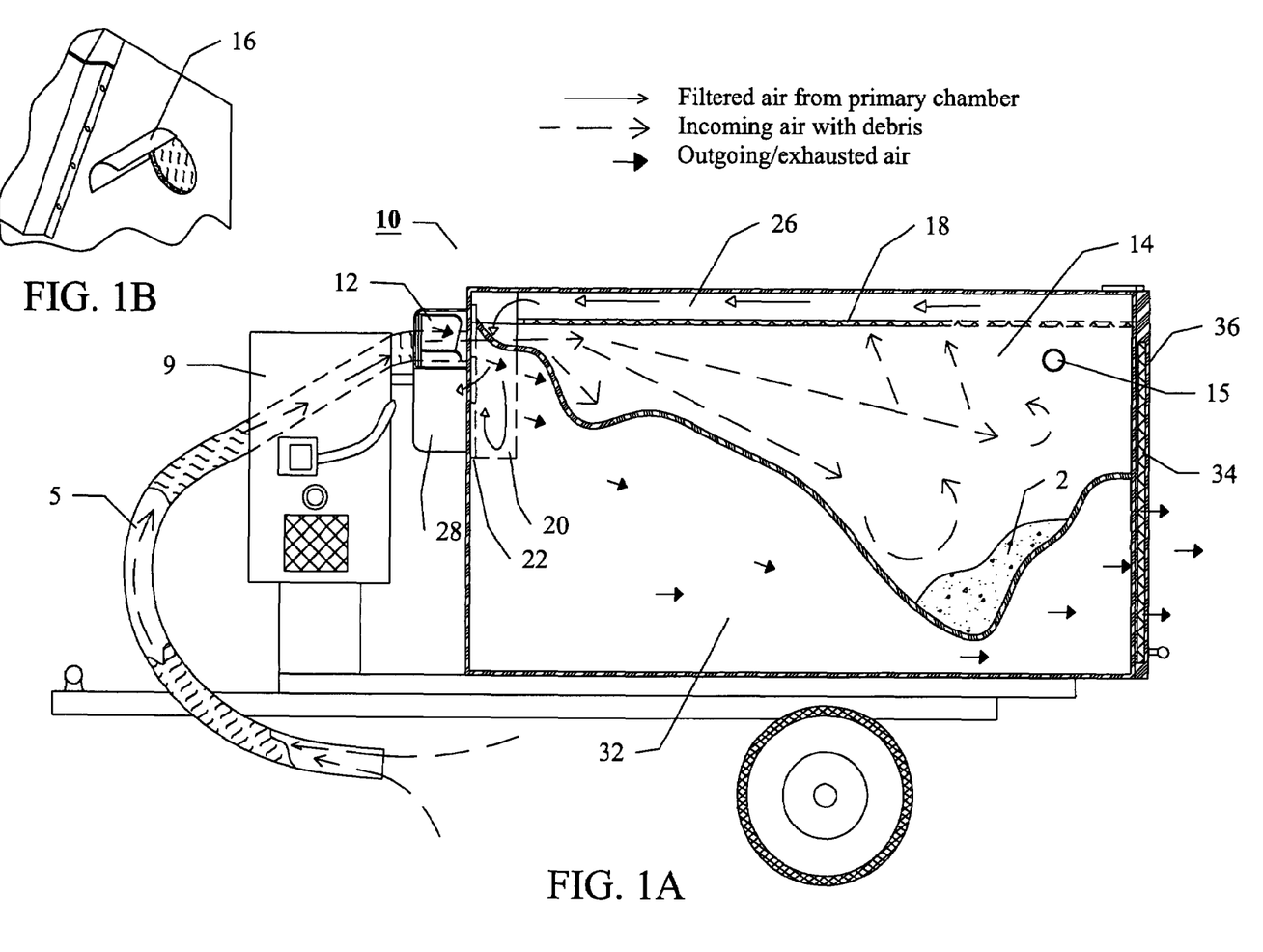
FIG. 1A is a side elevation cross-sectional view of a preferred embodiment of the invention.
FIG. 1B illustrates an example of a blow-guard that can be used to direct the flow of air and debris coming into the primary chamber of the vacuuming machine downwards and towards the back of the chamber.
Figure 2:
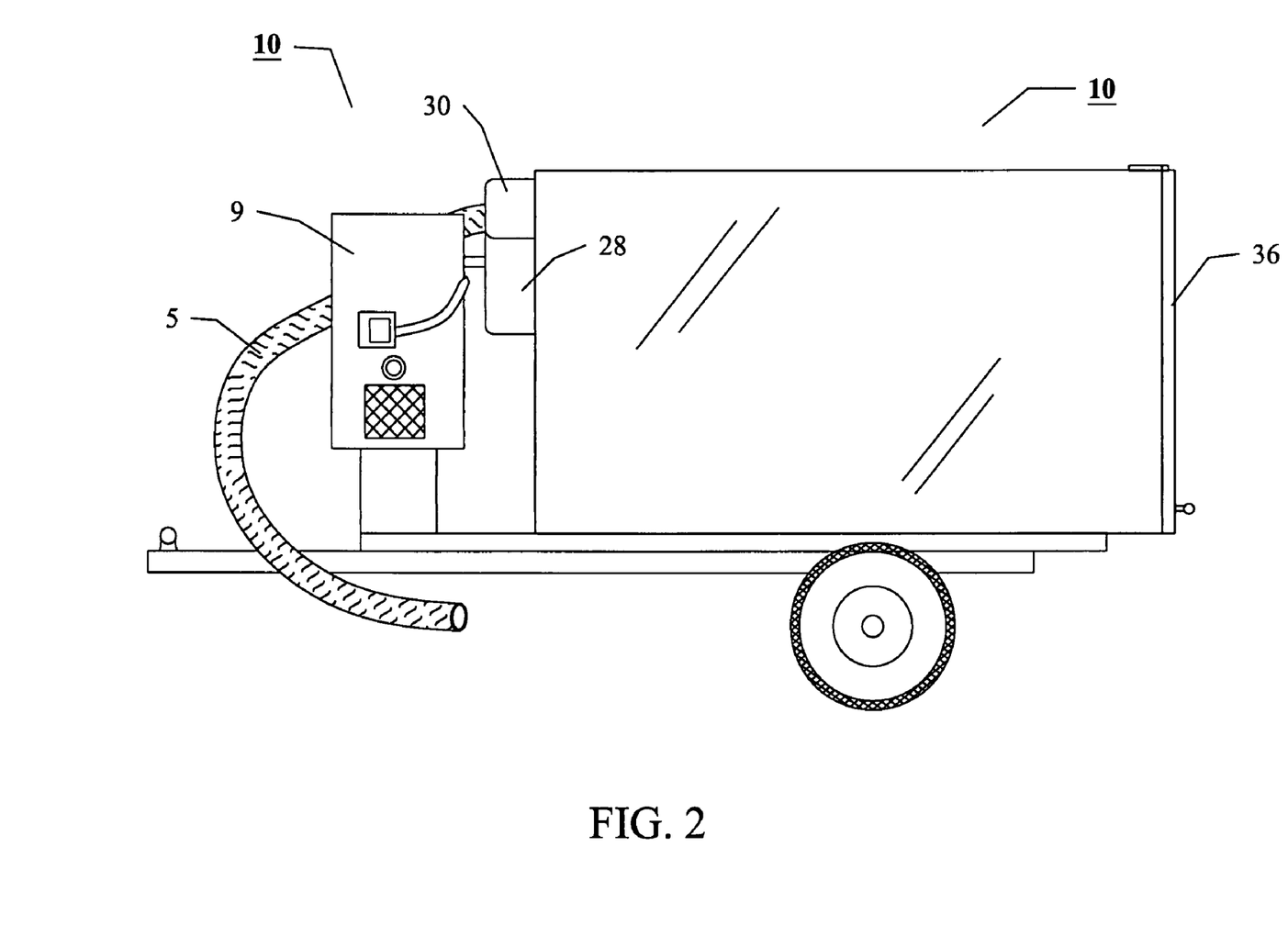
FIG. 2 is a side elevation view of a preferred embodiment of the invention.
Figure 3:
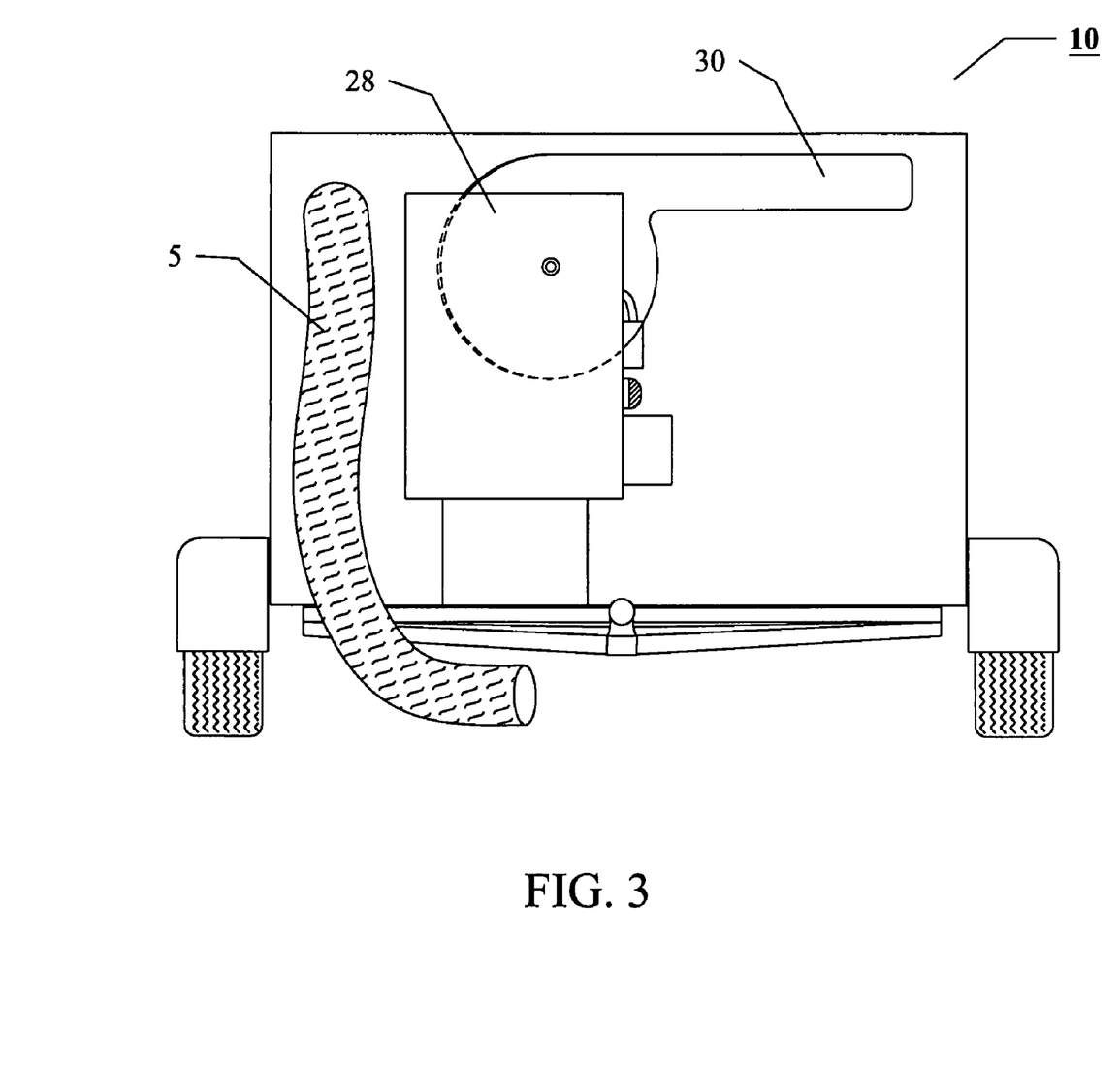
FIG. 3 is a front elevation view of a preferred embodiment of the invention. As can be seen in this Figure, the fan housing in this embodiment is contiguous with the connection duct leading to the secondary chamber.

In order to control the direction of the air and debris as it comes into the primary chamber, a tube, plate, panel, or similar device can be placed on, around, or near the vacuum inlet 7. One embodiment of the subject invention utilizes a semi-circular plate attached to and partially surrounding the circumference of the vacuum inlet 7 within the primary chamber 14. This device may be referred to as a flow guide 16, as illustrated in FIG. 1B. The flow guide 16 is positioned to direct the air and debris coming through the vacuum inlet 7 downwards and away from the primary filter 18. In a preferred embodiment, the flow guide 16 directs incoming air and debris 2 downwards and towards the back of the primary chamber, as diagramed by the dashed arrows seen in FIG. 1A.

The primary chamber 14 is an area for containing or storing the debris coming in through the vacuum inlet 7. The vacuum force of the vacuuming machine 10 is also created within the primary chamber 14. It is the primary chamber 14 from which the fan 12 evacuates air in order to produce the back pressure or vacuum necessary to create the suction power in the hose 5. It is possible for the primary chamber 14 to be many shapes or designs, including, but not limited to, square, rectangular, circular or semi-circular, or various three-dimensional polygonal shapes. The size and/or volume contained within the primary chamber is limited only by the ability of the vacuum system to create sufficient back pressure, or vacuum pressure, within the primary chamber 14. In a preferred embodiment, the primary chamber is relatively airtight allowing ingress of air only from the vacuum inlet and egress of air only by the fan. The walls of the primary chamber 14 should be rigid enough to withstand the vacuum forces created in the chamber and the force of the incoming air and debris from the vacuum inlet 7 when the vacuuming machine is in operation. The primary chamber 14 can be of a rigid wall construction comprising, but not limited to, metal, wood, plastic, rubber, glass, or combinations or composites thereof. It may also be possible for the primary chamber to be constructed of a covered frame assembly, wherein a rigid or semi-rigid framework is covered with some flexible, or semi-flexible material, such as, but not limited to, cloth, plastic or rubber sheeting, paper sheeting products, or combinations or composites thereof, etc. In a preferred embodiment, the primary chamber 14 has a rigid wall construction. In a further preferred embodiment, the primary chamber is constructed of sheet metal wherein the top, bottom and sides are formed or welded together to form an effectively airtight chamber. In an even further preferred embodiment, the primary chamber is constructed as a somewhat rectangular box which may be more easily mounted on a standing or support frame, or on a trailer frame for transport, as illustrated in the Figures. In a still further preferred embodiment, the primary chamber is constructed as an approximately 3.5' to about 4.5' tall by approximately 6.5' to about 7.5' long by approximately 3.5 to about 5.5' wide rectangular box as illustrated in the Figures.

Depending upon the construction of the primary chamber 14, as discussed above, it may be possible, or necessary, to have a view port to permit monitoring of the contents and/or fullness of the primary chamber 14. The view port 15 should not allow air or debris into the primary chamber that could adversely affect the operation of the vacuuming machine. In addition, the view port 15 can be any size or circumferential shape including but not limited to circular, oval, square, rectangular, or a variety of polygonal shapes that allows sufficient view into the primary chamber. In one embodiment, the view port 15 can be an opening with a relatively airtight door-like covering that can be opened when the vacuuming machine is not in operation. In a preferred embodiment, the view port 15 is a hole with a clear covering somewhere on the surface of the primary chamber 14 that allows constant viewing within the primary chamber. It is also possible for cameras, video, or other electronic viewing means to be utilized with the subject invention to monitor the contents or even the internal workings of the vacuuming machine in accord with techniques known in the art. It is further possible for sensors on or within the vacuuming machine to monitor contents and/or fullness and provide an alarm when maximum filling capacity is reached, or if problems develop during operation of the device, as will be readily apparent to the skilled artisan.

Figure 8:
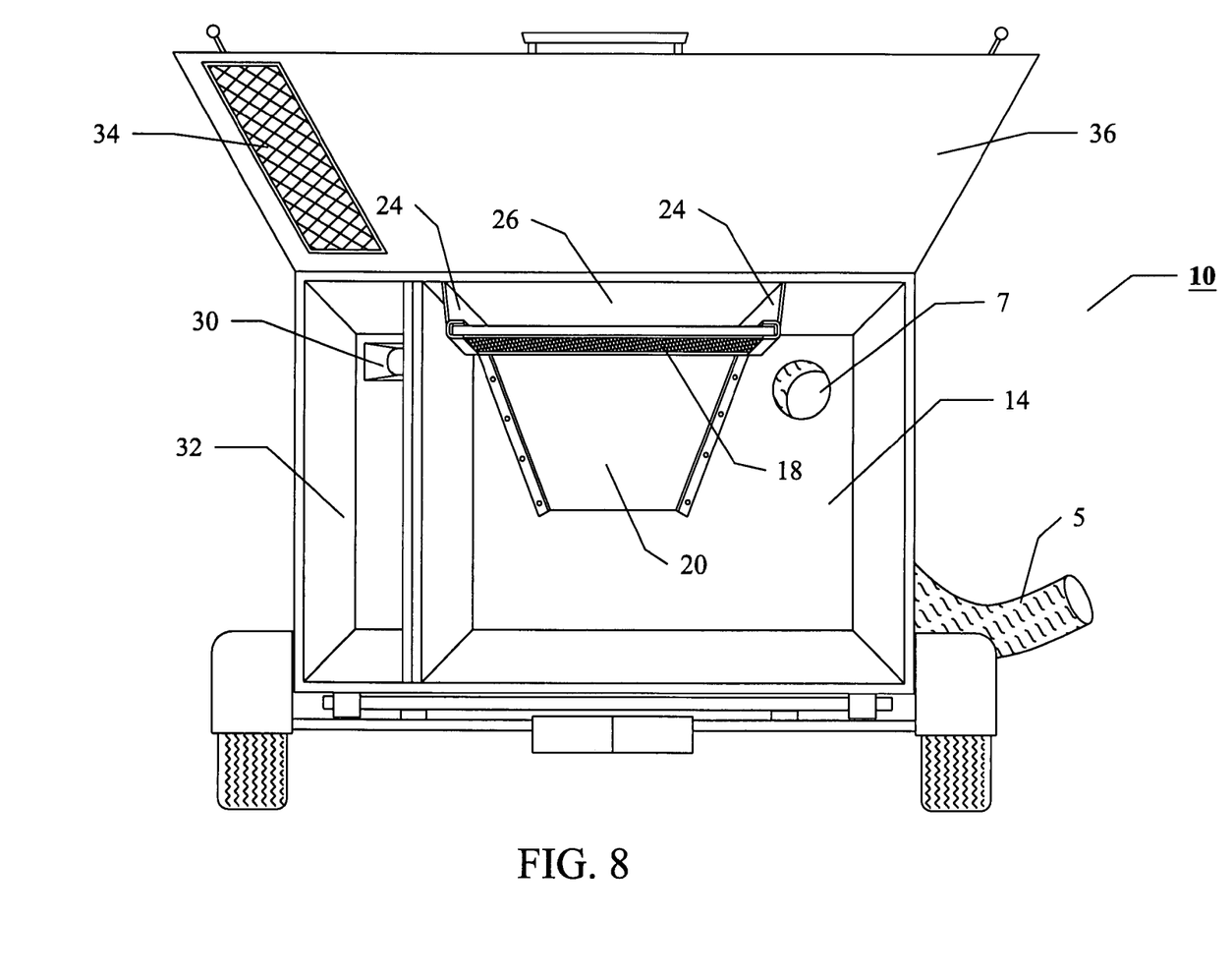
FIG. 8 is a rear view of a preferred embodiment of the subject invention with the rear door raised to show the internal layout of this embodiment of the invention.
Figure 9:
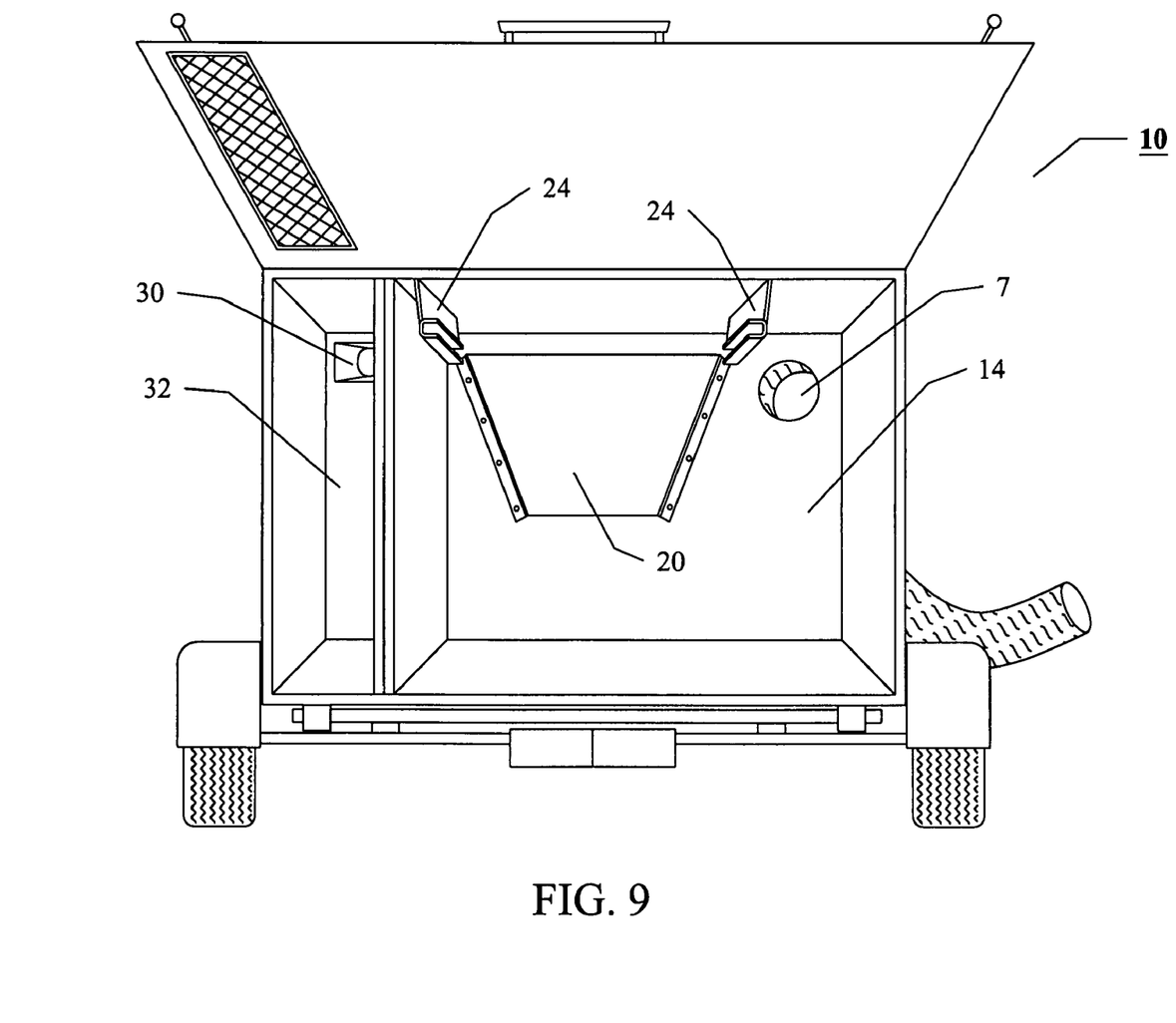
FIG. 9 is a rear view of a preferred embodiment of the subject invention with the rear door raised to show the internal layout of the same embodiment of the invention as depicted in FIG. 8. The filter has been removed in this view to show the position of the filter hopper.

Once air and debris have moved from the vacuum inlet 7 into the primary chamber 14, the natural force of gravity causes most or all of the incoming debris to fall out of the air stream and be deposited on the bottom of the primary chamber. The air circulating within the primary chamber can then be extracted by the fan in order to maintain the back-pressure or vacuum within the primary chamber. Ideally, the air is extracted at an area or point away from the incoming flow of air and debris, and more preferably at a distance from the debris that has fallen out of the incoming airflow. In addition, as the air is extracted, it is moved through a primary filter system and into a duct system that leads to the fan. This is illustrated in FIGS. 1A and 8. FIG. 1A illustrates the flow of air into the primary chamber 14 (dashed line arrows), through the primary filter 18 and the fan 12 (open headed arrows). Filter technology is highly advanced and those with skill in the art are able to determine the correct filter size and materials necessary to optimize its operation depending upon the level of filtration desired for the exhausting air, and depending on the type of debris contemplated to be vacuumed into the primary chamber. However, the type and size of filter used can have a significant impact on the air flow. It is well known to those with skill in the art that the total flow through a filter tends to be inversely proportional to the total surface area of the filter media. Therefore, increasing the surface area of a given filter can in reduces the air resistance through the filter, thereby increasing air flow. With regard to the subject invention, the purpose of the primary filter system is to ensure that overly large debris is not carried by the extracted airflow to the fan. Thus, it can be advantageous to place a primary filter 18 near the upper portion of the primary chamber 14, as shown in FIGS. 1A and 8, to reduce the likelihood of debris on the bottom of the primary chamber from being pulled into the primary filter 18. However, the type or style of the primary filter 18 may vary depending upon the type of materials being carried into the primary chamber 14. In a preferred embodiment it can be advantageous to use an enlarged primary filter system to reduce air flow resistance. The subject invention is designed to permit some amount of smaller debris and particulate matter coming through the primary filter 18, as will be described below. Therefore, it may not be necessary to utilize an extremely efficient filter or filter system for most applications. Thus, in a preferred embodiment, the primary filter 18 comprises a metal grating with openings approximately 0.25 inch to about 1 inch in diameter. In a further preferred embodiment, the primary filter is approximately 6 feet to about 7 feet long and approximately 2 feet to about 4 feet wide. In an even further preferred embodiment, the primary filter 18 is located at or near the top of the primary chamber 14. It may be advantageous as well for the primary filter 18 to be designed for periodic replacement or cleaning. Therefore, in a still further preferred embodiment, the primary filter 18 can be slidably inserted into filter brackets 24 at or near the upper portion of the primary chamber 14, for example as shown in FIGS. 8 and 9. The filter brackets 24 may extend along the length of the primary filter 18, such that, when the primary filter 18 is in place within the filter brackets 24, air, and perhaps some particulate matter, within the primary chamber 14 may only be extracted by the fan 12 through the primary filter 18 and carried into a filter duct system, as will be described below.

At this point, air from the primary chamber 14 must be carried to the fan to be exhausted from the vacuum system. As is known in the art, it is this continual extraction of incoming air that maintains the back-pressure or vacuum within a given vacuum system, including the one of the present invention. Therefore, as mentioned above, the fan pulls air and, perhaps, some debris or particulate matter 2 from the primary chamber 14 through the primary filter 18 and into a filter duct 26 which is contiguous with the primary filter. The airflow through the primary filter 18 into the duct system is illustrated in FIG. 1A by the open headed arrows. As with any vacuum system, the ability of air to flow through the vacuum machine can be important to overall function and efficiency. Therefore, as discussed previously, it may be beneficial to reduce obstruction of airflow to the fan. In a preferred embodiment, the filter duct 26 of the present invention contains the airflow and any particulate matter that comes through the primary filter 18. In a further preferred embodiment, the filter duct 26 is an open area, free of obstructions that may cause deposit of particulate matter within the filter duct 26. In a preferred embodiment, as illustrated in FIGS. 1A and 8, the filter duct 26 is an area located above the primary filter 18 when the primary filter is placed within the filter brackets 24. In yet a further preferred embodiment the filter duct 26 comprises an area approximately 3 inches to about 5 inches from the top of the primary chamber and running the length and width of the primary filter 18.

Once air and debris are moved into the filter duct 26, they are moving at a relatively slower rate of speed towards the fan. However, at this point, if there has been any particulate matter carried through the filter into the duct, it can be important to ensure that the debris is exhausted by the fan 12, and the fan's blades 13 to prevent debris build-up. To accomplish this, the speed of the air within the filter duct 26 can be increased in order to keep debris "floating" or "mixed" with the exhausting air. This may be most easily accomplished by causing the exhausting air within the filter duct 26 to flow into an area of reduced volume. By way of example, this can be likened to water flow from a pipe of large diameter to one of a smaller diameter. Physical laws dictate the flow of water within the smaller diameter pipe will flow faster than the flow of water within the larger diameter pipe. A similar effect can be accomplished with the subject vacuum system by moving the air and debris within the filter duct 26 into a smaller volume before it reaches the fan 12. The subject invention can accomplish this with the use of a filter hopper 20 and a fan plate 22, which are illustrated individually in FIGS. 5 and 6, respectively.

Figure 6:
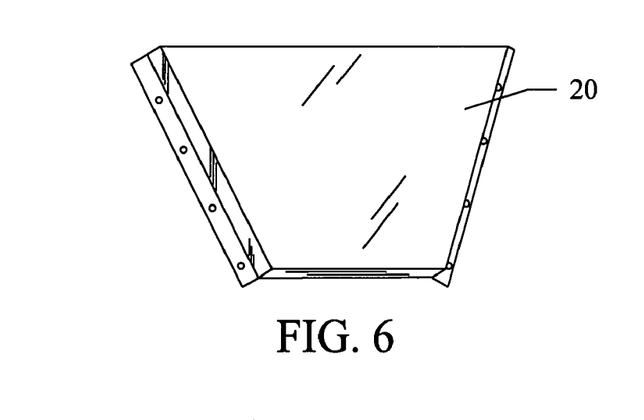
FIG. 6 is a perspective view of the filter hopper used in a preferred embodiment of the subject invention.

Referring to FIG. 1A, it can be seen that, when in place, the primary filter 18 is contiguous with the edge of the filter hopper 20, such that air and any particulate matter within the filter duct 26 is directed towards the fan 12 through the filter hopper 20. FIG. 8 illustrates an embodiment of the preferred placement of the filter hopper 20. FIG. 9 is a further clarification of an embodiment of the filter hopper 20. As illustrated in FIG. 9, the topmost edge of the filter hopper 20 is even with the bottom edge of the filter brackets 24 such that when the primary filter 18 is in position on the filter brackets 24, the end of the primary filter 18 rests along the top most edge of the filter hopper 20, forming a continuous duct along the top of the primary filter all the way to the filter hopper 20 and, as will be shown, into the fan 12. The filter hopper 20 may be essentially a hollow chamber into which air and debris from the filter duct 26 are deposited before moving towards the fan. The form of the filter hopper can be any number of shapes, including, but not limited to circular, oval, rectangular, square, or other polygonal shape. In a preferred embodiment, the filter hopper is a trapezoidal shape with the longer of the parallel sides contiguous with the primary filter 18, as illustrated in FIGS. 6, 8, and 9. In addition, filter hopper 20 can be made of a variety of materials, for example, but not limited to, metals, woods, plastics, plexiglass, glass, etc, or combinations or composites thereof. In one embodiment, the filter hopper 18 may be made of a clear plastic material, e.g., plexiglass, that allows observation of the area within the filter hopper 18 for maintenance or monitoring purposes. In one preferred embodiment, the filter hopper is made of sheet metal approximately one-quarter to one-half inch in thickness. In a further embodiment, the filter hopper has a covered opening that can allow access, for maintenance or other purposes, to the interior of the filter hopper 18 without having to remove the filter hopper from the vacuum machine 10. In a further preferred embodiment, the filter hopper is approximately 20 inches to about 26 inches tall; the longer and shorter parallel sides are approximately 36 inches to about 40 inches, and approximately 11 inches to about 15 inches, respectively. As mentioned above, the upper most edge of the filter hopper 20 and the end of the primary filter 18 preferably join to form a closed filter duct 26. If necessary, additional panels may be attached to or around the filter hopper to ensure that the filter duct is closed when the primary filter is installed. Therefore, the width of the filter hopper 20 may be dependent upon the length of the edge of the primary filter to which it meets. The volume within the filter hopper 20 is preferably approximately three-fourths to about one-quarter of the available volume within the filter duct 26. As a result, as mentioned above, the movement of air and debris from a large volume, within the filter duct 26, into a smaller volume, within the filter hopper 20, before it reaches the fan 12 can cause the air and debris to become more agitated. Therefore, in a still further preferred embodiment, the filter hopper 20 is approximately 7 inches to about 10 inches in depth which, with the above dimensions, can create a volume approximately $\frac{1}{3}$ the volume of the filter duct 26 of the preferred embodiment described above.

Figure 5:
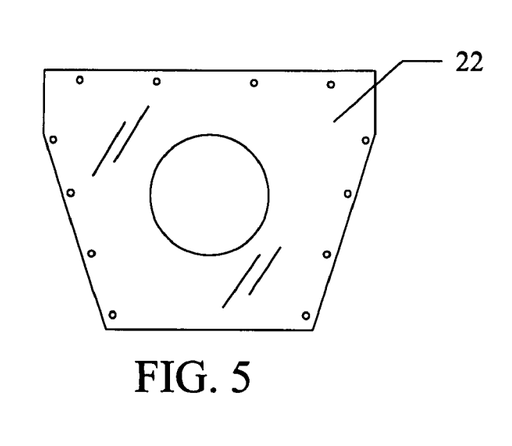
FIG. 5 is front elevation view of the fan plate used in a preferred embodiment of the subject invention.
Figure 10:
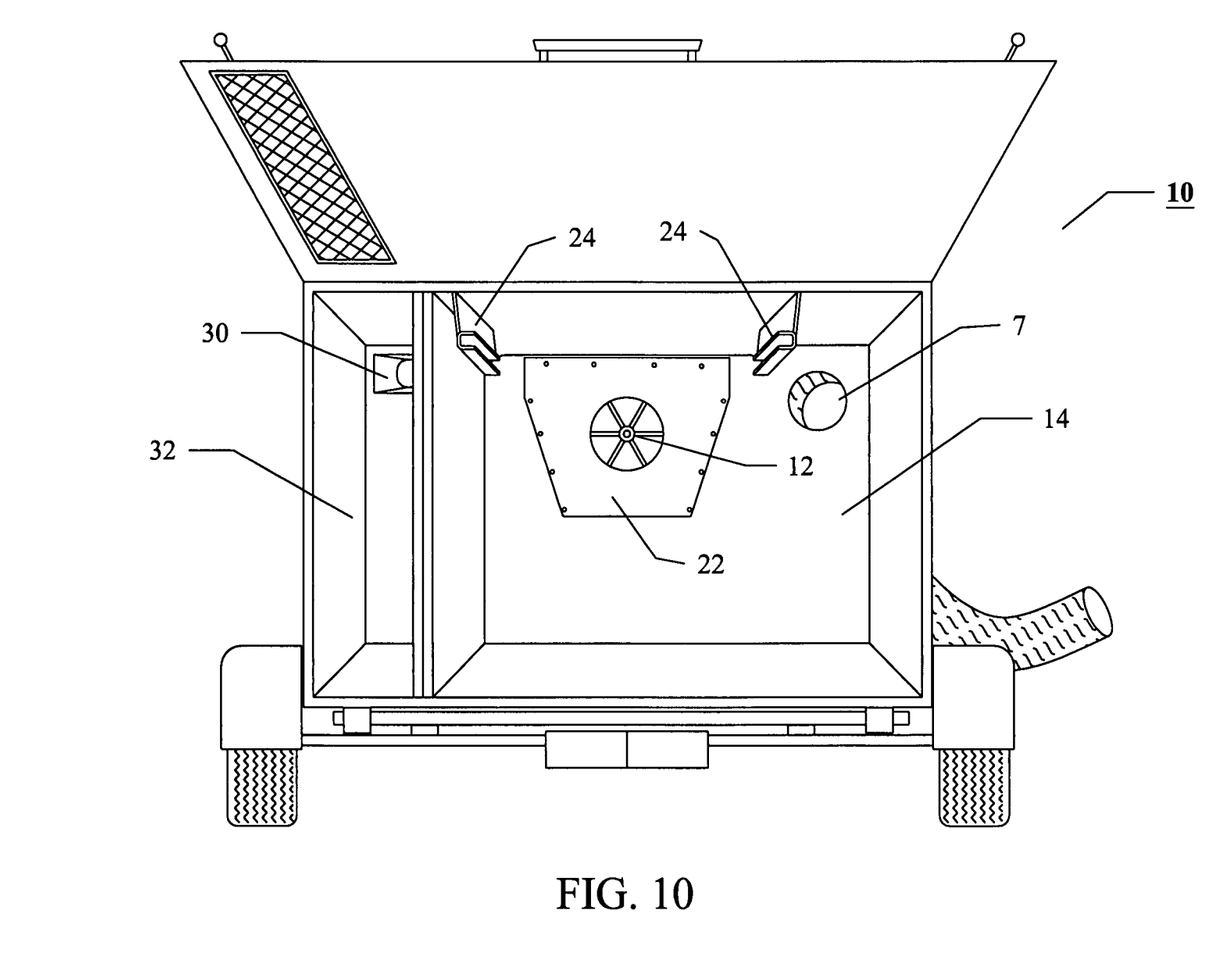
FIG. 10 a rear view of a preferred embodiment of the subject invention with the rear door raised to show the internal layout of the same embodiment of the invention as depicted in FIGS. 8 and 9. The filter and filter hopper have been removed in this view to show the position of the fan plate.
Figure 11:
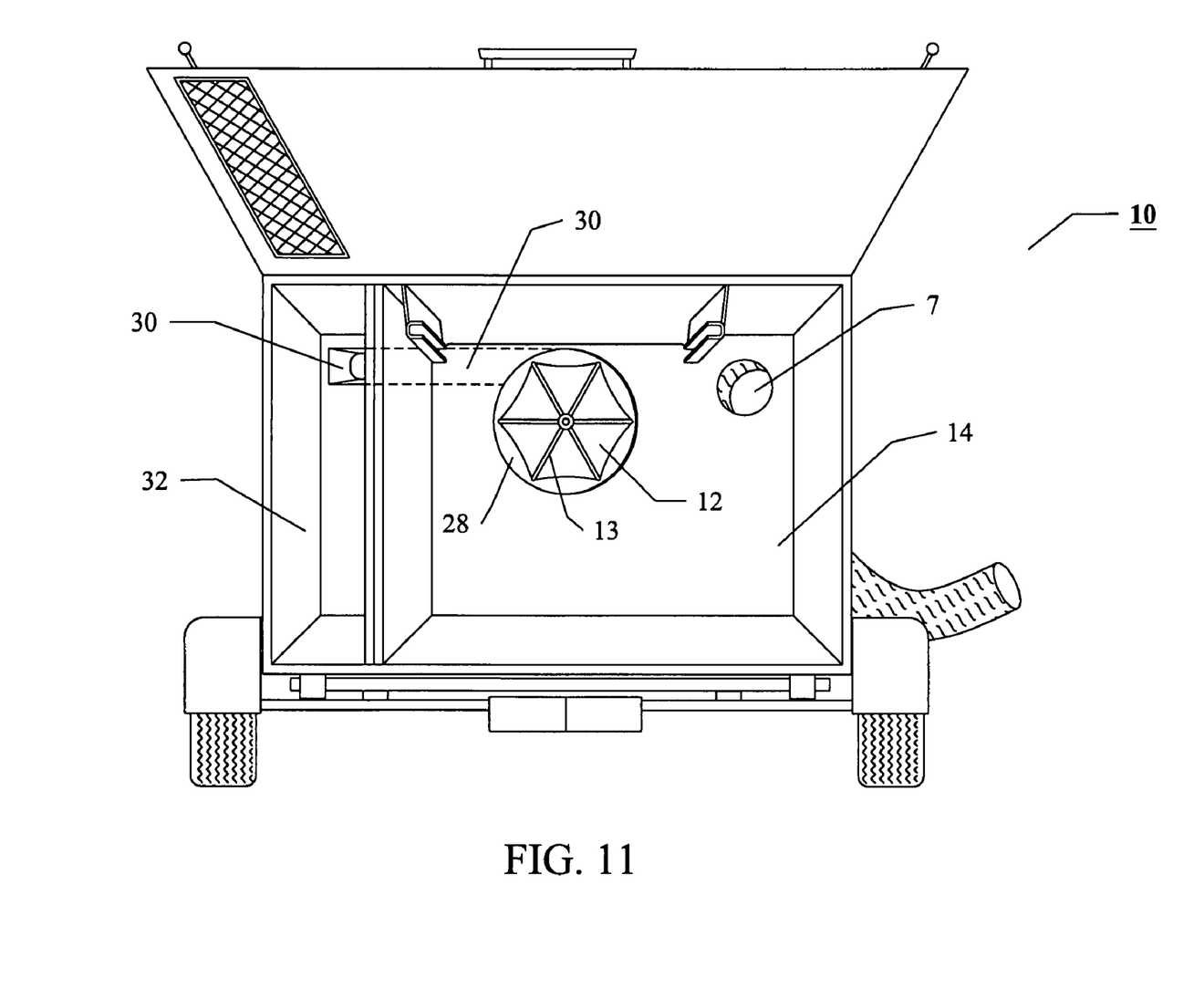
FIG. 11 a rear view of a preferred embodiment of the subject invention with the rear door raised to show the internal layout of the same embodiment of the invention as depicted in FIGS. 8, 9, and 10. The filter, filter hopper, and fan plate have been removed in this view to reveal the position of the fan within the external housing. Also illustrated is the continuity between the fan housing and the connection duct (dotted lines), which leads directly into the second chamber.

As mentioned in the previous paragraph, it can be important that any debris or particulate matter that has been carried through the primary filter 18 to the fan is passed by the fan 12 onto the next step of the vacuum machine 10 process. Therefore, in order to further increase the agitation and the speed at which the air and debris meet the fan, and thus increase the likelihood of any debris or particulate matter being properly routed through the fan 12, the air and any debris or particulate matter within the filter hopper can be further restricted to a smaller volume, or directed through a pipe or opening of smaller diameter. The subject invention utilizes a fan plate 22, which is illustrated in FIG. 5. As mentioned, in the previous paragraphs, the fan resides in a sealed chamber or fan housing 28 with contiguous ducts that direct the flow of air and debris coming into the fan, via the filter duct 26, and the flow of air and debris to be carried away from the fan. The fan plate 22 of the subject invention is positioned in front of the fan, between the fan 12 and the filter hopper 20, and encloses the fan within the fan housing 28 allowing air to reach the fan 12 via an opening in the fan plate 22. As illustrated in FIGS. 5 and 10, the fan plate 22 has an opening such that, when in place over the fan housing 28 and the fan 12, the opening in the fan plate 22 is centered over the central hub of the fan 12. Thus, in order for the air and debris within the filter hopper 20 to reach the fan 12, it must first pass through the opening, i.e., constriction, within the fan plate 22. The opening may be of almost any shape including, but not limited to, circular, oval, squared, rectangular, or other polygonal shape. It has been mentioned above that a preferred embodiment of the subject invention utilizes a fan with curved blades, such that the blades are higher at the outside edge of the fan than they are in the center or hub of the fan (refer to FIG. 4A). When the fan plate 22 is in place over the fan housing 28 and the fan 12, the opening in the fan plate may be centered over the central hub of the fan. This can permit air and debris to enter at the central hub of the fan and can allow the curved blades of the fan to direct the air and debris to the top or edges of the blades 13 for deposit into a duct for exhausting the air out of the vacuuming machine. In a preferred embodiment, the opening within the fan plate 22 is circular and centered directly over the central hub of the fan when the fan plate is in position over the fan housing 28. In a further preferred embodiment, the opening in the fan plate 22 is approximately 10" to about 15" in diameter. In a further preferred embodiment, the opening in the fan plate is approximately 12 inches to about 14 inches in diameter. In the subject invention, the fan plate is designed as a single separate piece, which can be removably attached to the fan housing. This allows an access to the fan that may be necessary for maintenance purposes. The fan plate can be manufactured of a variety of rigid or semi-rigid materials such as, but not limited to, metals, wood, plastics, rubber, etc., or combinations or composites thereof. It may also be possible for the fan plate to be made of flexible and/or semi-flexible materials with sufficient strength to withstand the pressure and forces created within the filter hopper 18, for example, but not limited to, plastic sheeting, cardboard materials, cloths, fabrics or other woven materials, etc. In one embodiment, the fan plate 18 is made of a clear or semi-clear material, e.g., plexiglass, which can permit viewing of the fan 12 for monitoring, maintenance, etc without removal of the fan plate 18. Of importance is the necessity of the opening in the fan plate 22 to withstand the pressure of the air and debris or particulate matter. As such, it can be advantageous to reinforce the edgings of the opening to prevent wearing, ripping, tearing, shredding of the edges of the opening. It will be appreciated by those in the art that the fan plate 22 of the subject invention can be designed in a myriad of fashions which would accomplish the same or similar effect. In a further embodiment, the fan plate can be two or more panels or pieces covering the fan housing. In addition, a ring or tube could be fixedly attached within the opening or there could be two or more openings to further restrict and/or direct air and debris or particulate matter entering the fan. In a preferred embodiment, the fan plate is made as a single piece from metal sheeting approximately one-quarter to about one-half inch in thickness. In a further preferred embodiment, the filter hopper 18 and the fan plate 22 have matching drill holes, as illustrated in FIGS. 5 and 6, such that the two pieces can be bolted simultaneously against the fan housing 28 with one set of bolts and screws.

Once the air and debris or particulate matter has reached the spinning fan 12 the blades 13 essentially force the air and debris or particulate matter into an connection duct 30 that leads to a second chamber. Connection duct 30 is preferably a sealed space through which the air and debris from the edge of the blades 13 move as they pass the opening to the connection duct 30. In a preferred embodiment, the opening to the connection duct 30 is located at the top of the fan housing, such that the spinning fan forces air and debris or particulate matter from the upper portion of the fan housing 28. In a further preferred embodiment, the fan spins in a direction that allows the blades 13 to first pass across the top of the opening of the connection duct 30 and move downward over the opening to deposit air and debris into the connection duct 30. The connection duct 30 can be of any circumferential shape including, but not limited to, circular, squared, rectangular, oval, or any other polygonal shape. The connection duct 30 can comprise a myriad of materials including, but not limited to, metals, plastics, glass, woven materials, etc., or combinations or composites thereof. Ideally, the connection duct 30 is sealed to prevent premature exhausting of the air or debris within the connection duct 30. In a preferred embodiment, the connection duct 30 is a steel housing that leads from the top of the fan housing 28 to a secondary chamber. In a further preferred embodiment, the connection duct 30 is an approximately 10 inch square tubular housing.

At this point in the vacuuming machine 10 of the subject invention, there is a repeat of the process occurring within the primary chamber 14. The accelerated air is moving through the connection duct 30 into a secondary chamber 32, i.e., thereby moving through an area of smaller volume to an area of larger volume. Just as within the primary chamber 14 described previously, the air, debris, and particulate matter immediately decelerate upon entry into the secondary chamber 32. However, the forces within the connection duct 30 and the secondary chamber 32 are a fraction of the forces created by the vacuum inlet 7 within the primary chamber 14. Therefore, when the air and debris or particulate matter within the connection duct 30 pass into the secondary chamber 32, even fine particulate matter can settle through the air column to the bottom of the secondary chamber. In a preferred embodiment, the secondary chamber is approximately 15% to about 25% of the volume of the primary chamber 14. In a further preferred embodiment, the ratio of the volumes of the primary and secondary chambers is approximately 5:1. In yet another preferred embodiment, the secondary chamber 32 is constructed as an approximately 3.5' to about 4.5' tall by approximately 6.5' to about 7.5' long by approximately 0.5' to about 1.5' wide rectangular box as illustrated in the Figures. In another most preferred embodiment, the secondary chamber 32 is positioned parallel to the primary chamber 14, such that the primary and secondary chambers can form a single rectangular box-like compartment, as illustrated in the Figures.

Figure 7:
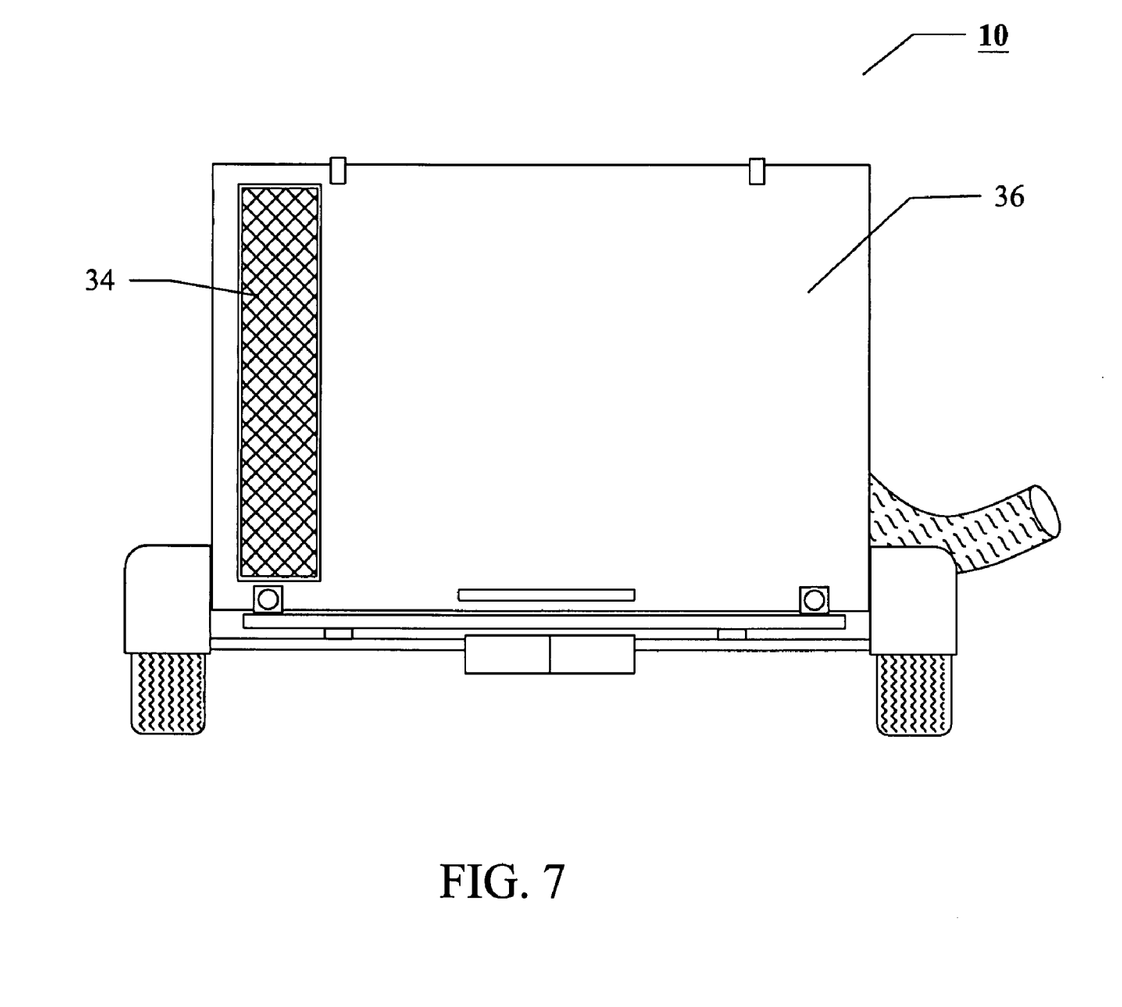
FIG. 7 is a rear elevation view of a preferred embodiment of the subject invention. This view illustrates the invention with the rear door in the down and sealed position.

After moving through the secondary chamber 32 and depositing any remaining debris or particulate matter that was carried through the fan 12, the relatively clean air evacuates through an opening in the secondary chamber. In a preferred embodiment, the opening is located on the opposite side of the secondary chamber 32 from the connection duct 30. This maximizes the opportunity for debris and particulate matter to be pulled from the air column before it exits the vacuuming machine 10. As a further precaution, the opening from which the exhausted air exits may be covered with an additional grid or exhaust air filter 34. The exhaust air filter should provide a minimum amount of airflow resistance. The exhaust air filter 34 may comprise any variety of materials with a multitude of pore diameters. Filter technology is highly advanced and those with skill in the art will be able to optimize the filter and filter materials necessary depending upon the level of microfiltration desired for the exhausted air. However, it is also commonly known in the art that the type of filter used can have a significant impact on the air flow. The total resistance of the filter is inversely proportional to the total surface area of the filter media. Therefore, increasing the surface area of a filter increases the volume of air flow through the filter. Therefore, it can be advantageous to use an enlarged exhaust opening and exhaust air filter 34 to reduce air flow resistance from the secondary chamber 32. The subject invention is particularly suited for farm use for cleaning mostly organic material. It is not anticipated that microfiltration of the exhausted air would be necessary. Therefore, in a preferred embodiment, the exhaust air filter 34 comprises a metal grating with openings approximately 0.25 inch to about 1 inch in diameter. In a further preferred embodiment, the primary filter is approximately 3.5 feet to about 4.5 feet long and approximately 1 foot to about 3 feet wide. In yet a further preferred embodiment, the exhaust air opening extends across almost the entire rear wall of the secondary chamber 32 and the exhaust air filter 34 covers the entire exhaust air opening, as illustrated in FIGS. 1A, 7, and 8.

As mentioned previously, the subject vacuum machine 10 could be adapted for home use. Such adaptation might require changing the filter systems within the vacuum machine 10 in order to filter a wider range of particulate matter, microparticles, allergens, etc. Those with skill in the art would be able to determine the type of filter necessary for a given situation and the size of the filter that would provide the least amount of resistance in the vacuum machine.

Figure 12:
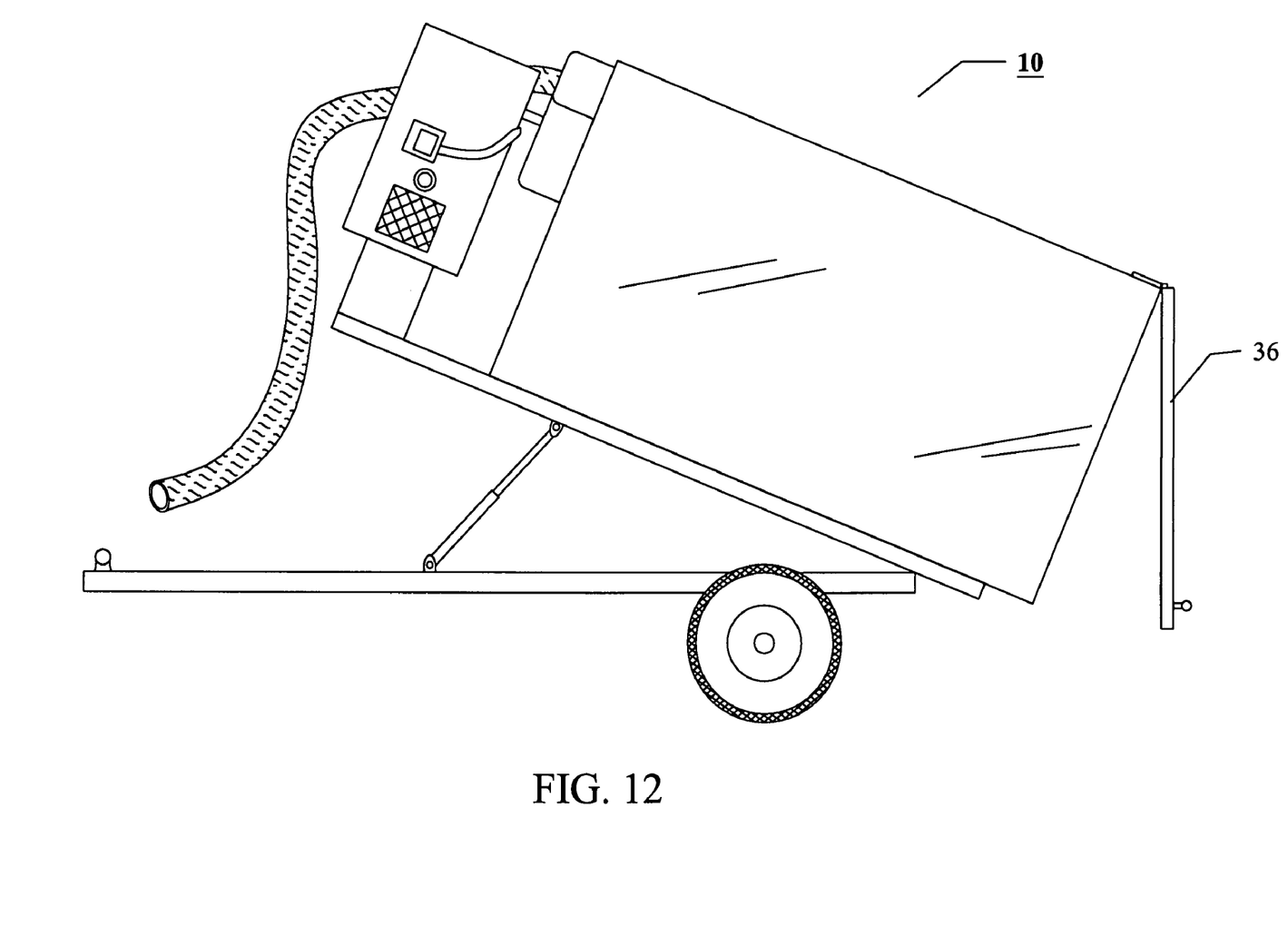
FIG. 12 illustrates how the vacuuming machine of the subject invention can be emptied by dumping the contents from the rear of the chambers.

In use, the vacuum machine 10 will need to be emptied. The technique for accomplishing this can depend upon the size of the vacuum machine, the materials from which it has been constructed, location, contents, etc. In one embodiment, the primary and secondary chambers, 14 and 32 respectively, can have a means for pouring the contents through openings in the chambers. This technique is preferred for vacuum machines 10 designed on a somewhat smaller scale. As mentioned previously, the subject invention is particularly suited for industrial or farm use, especially in the cleaning of animal stalls. Therefore, in a preferred embodiment the subject invention is designed with a swinging rear door 36 at the rear of the primary and secondary chambers that is hinged at the top of the primary and secondary chambers, as shown in FIGS. 2, 7, and 8-11. When in the closed position, the rear door 36 acts to seal not only the primary and secondary chambers, 14 and 32 respectively, but it also seals the opposite end of the filter duct 26 furthest from the filter hopper 20. This ensures that air can only be exhausted from the primary chamber 14 through the primary filter 18. When desired, the vacuum machine can be tilted towards the swinging door, which causes the swinging door to open and the contents of the primary and secondary chambers, and anything left within the filter duct, to be dumped onto the ground, or into another container. The vacuum machine can then be returned to its original position and the rear door closed and fastened for re-filling. One with skill in the art can easily devise any number of other methods for dumping the contents of the vacuum machine. In a preferred embodiment, at least one pneumatic lift is used to raise the front of the vacuum machine and allow the contents to be dumped from the back of the vacuum machine, as illustrated in FIG. 12.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A vacuuming device, wherein said device comprises:
 a primary chamber, having an interior for the deposit and collection of debris, with at least one first ingress opening for ingress of air and debris and at least one second opening for the extraction of air and entrained debris from the primary chamber;
 a fan connected to a power source, which turns the fan to create a vacuum within said primary chamber by extracting air from within said primary chamber through the at least one second opening;
 a fan plate positioned between the fan and the primary chamber, said fan plate having one or more openings through which air and entrained debris, extracted from the primary chamber, passes before reaching the fan;
 a filter hopper affixed over the fan plate, such that the filter hopper and fan plate form a hollow chamber, the filter hopper further comprising at least one opening contiguous with the second opening in the primary chamber through which air and all entrained debris from the primary chamber enters before passing through the one or more openings in the fan plate;
 a fan housing disposed over the fan such that the fan is enclosed by the fan housing and the fan plate;
 a filter duct, in the primary chamber, contiguous with the opening in the filter hopper and comprising a primary filter through which air and entrained debris from the primary chamber pass prior to entering the filter hopper;
 a secondary chamber, having an interior that is separated from the primary chamber, and an exhaust air filter therein; and
 a connection duct having first and second openings, said first opening being connected to the fan housing and said second opening being connected to the secondary chamber, such that air and entrained debris from the fan housing pass through the connection duct into the secondary chamber where the entrained debris settles and air exits the device through the exhaust air filter.

2. The vacuuming device, according to claim 1, wherein the primary filter is held in place within the primary chamber using filter brackets.

3. The vacuuming device, according to claim 2, wherein the primary filter and the filter brackets are configured to form the filter duct which conveys air received from the primary chamber to the filter hopper.

4. The vacuuming device, according to claim 3, wherein the filter hopper has a top edge that is proximal to said primary filter, and a bottom edge further from said primary filter, the width of said filter hopper along said bottom edge being approximately 30% to about 50% less than the width of said filter hopper along said top edge.

5. The vacuuming device, according to claim 1, wherein the primary filter is a metallic mesh approximately 6 feet to about 7 feet long and approximately 2 feet to about 4 feet wide.

6. The vacuuming device, according to claim 4, wherein the openings within the metallic mesh of the primary filter are approximately 0.5 square inch to about 2 square inches.

7. The vacuuming device, according to claim 1, wherein the at least one ingress opening has a hose, pipe, or other channel attached thereto and extending external to the vacuum device, through which air can be carried into the vacuuming device.

8. The vacuuming device, according to claim 1, wherein a flow guard is mounted proximal to said ingress opening such that it directs air coming into the vacuuming device towards a desired location within the primary chamber.

9. The vacuuming device, according to claim 1, wherein each of the primary and secondary chambers comprises one or more debris-removal openings, and wherein the device further comprises covers which can be closed over the debris-removal openings when the vacuuming machine is in use.

10. The vacuuming device, according to claim 9, comprising a means for tilting either or both of said primary and secondary chambers, individually or simultaneously.

11. The vacuuming device, according to claim 1, further comprising at least one view port for observing an interior portion of the device.

12. The vacuuming device, according to claim 11, wherein said view port permits observation of the primary chamber.

13. The vacuuming device, according to claim 11, wherein said view port permits observation of the secondary chamber.

14. The vacuuming device, according to claim 1, wherein the primary and secondary chambers are positioned side by side as the device is in its upright, in-use position.

15. The vacuuming device, according to claim 1, wherein the opening in the fan plate is circular and positioned over the center of the fan.

16. The vacuuming device, according to claim 15, wherein the opening in the fan plate is approximately 10 inches to about 15 inches in diameter.

17. The vacuuming device, according to claim 1, wherein the volume of the primary chamber is from approximately 25% to about 1100% larger than the secondary chamber.

18. The vacuuming device, according to claim 1, wherein the primary chamber is configured as a substantially rectangular box, approximately 3.5 feet to about 4.5 feet tall, approximately 6.5 feet to about 7.5 feet long, and approximately 3 feet to about 5.5 feet wide.

19. The vacuuming device, according to claim 1, wherein the secondary chamber is configured as a substantially rectangular box approximately 3.5 to about 4.5 feet tall, approximately 6.5 feet to about 7.5 feet long, and approximately 0.5 foot wide to about 3 feet wide.

* * * * *